Patented Oct. 4, 1949

2,483,559

UNITED STATES PATENT OFFICE 2,483,559

PROCESS OF PREPARING VANILLIC ACID

Irwin A. Pearl, Appleton, Wis., assignor, by mesne assignments, to Sulphite Products Corporation, Appleton, Wis., a corporation of Wisconsin No Drawing. Application May 29, 1947,
Serial No. 751,475

6 Claims. (Cl. 260—521)

The present invention relates to the production of vanillic acid from lignin and lignin substances. More specifically, the present invention is directed to processes of producing vanillic acid in high yields from lignin substances present in waste by-products from pulping and saccharification processes.

Many attempts have been made in the past to produce vanillic acid from various materials including lignin. Of the many lignin degradation processes described in the literature only a few report the presence of vanillic acid and then only in negligible amounts. For example, Lautsch working with Freudenberg and Engler on the degradation of lignin with nitrobenzene and alkali found that the complex reaction mixture contained vanillic acid, but only in minute amounts. Ber. 73, 167 (1940). An example of a degradation process failing to report the formation of any vanillic acid, i. e. even the presence of a minute amount of acid in the reaction mixture, is Lautsch's subsequent work also carried out at the Freudenberg Laboratory in which "cuproxam-lignin" was degraded in the presence of metallic oxides and potassium hydroxide. This bimetallic oxide degradation process was found by Lautsch to produce the aldehyde, vanillin, only and in yields no better than those obtained by alkali alone, and the process was reported by Lautsch and his co-workers to be of little or no technical interest. Agnew. Chem. 53, 450 (1940). As a result of the above and the failure of the art to provide an economical vanillic acid process, vanillic acid up until my investigations in this field including the discoveries resulting in the present invention, remained a "laboratory curiosity."

I have discovered that vanillic acid may be readily produced in high yields from lignin or lignin substances by digesting the lignin material with silver oxide in an aqueous alkaline reaction mixture. I have also discovered that the vanillic acid may be readily recovered from the degradation products after acidification of the alkaline reaction mixture.

Illustrative examples, according to the invention, are as follows:

Example I

Freshly precipitated silver oxide was prepared by stirring a solution containing 40 parts of sodium hydroxide into a solution containing 170 parts of silver nitrate. The oxide was filtered and washed free of traces of nitrate and partially dried by suction and placed in a vessel with 500 parts of water. To this mass 150 parts of solid sodium hydroxide was added with vigorous stirring, and heat applied if necessary to raise the temperature of the mass to about 60° C. Ordinarily, heating is not required as the heat of solution provides an adequate reaction temperature. To this warm mass was added 50 parts of basic calcium lignosulfonate, which contained about 60% of lignin. Stirring was continued during this addition and an immediate mirror of silver was formed on the walls of the vessel while the temperature rose to 100° C. and a rather violent boiling took place. The vapors evolved were retained by a reflux condenser, and stirring was continued until the mixture became cool.

After cooling and removal of the metallic silver, e. g. by filtration, centrifugation, etc., the alkaline solution was acidified with sulfur dioxide or a strong mineral acid such as sulfuric or hydrochloric acids, and the resulting acidic mixture extracted with a water-immiscible vanillic acid solvent such as ether, benzene, etc. This extract contains vanillic acid which may be readily isolated by extracting the solvent extract with an aqueous bicarbonate solution, acidifying the bicarbonate solution, e. g. by addition of sulfuric acid, and then extracting the acidic aqueous mixture with an organic water-immiscible solvent of the type employed in the initial extraction. Distillation or evaporation of the organic solvent yields about 28% crude vanillic acid based on the lignin content of the original calcium lignosulfonate employed.

The vanillic acid may also be recovered or purified by a number of ways including esterification of the initial ether extract or isolated acid fraction with alcohol to form the vanillate, followed by hydrolysis to vanillic acid in accordance with the process described in my co-pending application Serial No. 676,573 filed June 13, 1946. One of the preferred purification methods as disclosed in another of my co-pending applications Serial No. 536,039, filed May 17, 1944, now Patent No. 2,431,419, calls for precipitation of unwanted impurities by the addition of neutral lead acetate to the acid fraction containing vanillic acid.

Example II

About 50 parts of calcium lignosulfonate and 190 parts of sodium hydroxide are mixed in a vessel with 500 parts of water. To this mixture, which is warmed if necessary to provide a reaction temperature of about 50° C., is slowly added with stirring an aqueous solution containing 170 parts of silver nitrate. With this procedure it has been found desirable to start the reaction at a temperature not much above 50° C. so that the silver nitrate may be added at a fair rate without producing too violent a reaction.

After the addition of the silver nitrate the alkaline reaction mixture containing some of the silver in suspension was separated by decantation and the residue was washed with water and the washings were added to the solution. This solution after acidification may be worked up and vanillic acid recovered therefrom in accordance with the procedure set forth under Example I. However, as the reaction mixture in Example II contains nitrates and/or nitrites, it is necessary to acidify first (at least partially) with a reducing acid such as sulfur dioxide in order to avoid unwanted nitration which may take place when the mixture is acidified (e. g. with $H_2SO_4$) prior to the isolation of the crude vanillic acid.

The process proceeds satisfactorily with any finely divided form of silver oxide. Results substantially identical so far as yields are concerned may be obtained by employing dry silver oxide in place of the freshly precipitated oxides employed in the above examples. The process of Example II where the silver oxide is formed in situ is in many instances the most convenient. However, in mass production the procedure of Example I has certain advantages as acidification with a reducing acid ($SO_2$) may be omitted. According to any one of these procedures, the reaction does not start when the initial temperature is materially below 50° C. At or above 50° C. the reaction is spontaneous and vigorous and liberates a considerable amount of heat.

It is preferable to have the alkali present in excess, sufficiently to keep the reaction mixture alkaline, and hydroxides of alkaline earth metals such as calcium may be used, although best results have so far been obtained with alkali metal hydroxides. The silver oxide is present preferably in slight excess and, in any event, not less than enough to oxidize the lignin base present. The amount of silver oxide employed in the above examples represents a substantial excess, and the use of smaller amounts of silver is primarily a problem of economy considering the cost of the lignin substance or material compared with the cost of reprocessing the silver. The vanillic acid, however, is not contaminated with silver or organic compounds containing silver and substantially all of the original silver (e. g. 99.4% or more) may be recovered in metallic form available for further use. The nitrate formed when the silver oxide is precipitated in Example I is available for reprocessing the metallic silver, to make a complete cyclic process.

Any lignin-containing substance may be advantageously employed in the preparation of vanillic acid as hereinabove disclosed. Examples are lignin remaining after the holo-cellulose content of wood has been subjected to saccharification; the lignin containing waste from acid or alkaline pulping processes, and wood in any form, corn cobs, straw, etc. It is desirable, however, that the lignin or lignin containing material be substantially free of cellulose and sugars. Such ingredients do not do harm to the desired reactions themselves, but if present they use up the reagents without any beneficial results, and thus increase the expense of the process as a whole.

The present application is a continuation in part of my prior application, Serial No. 536,039, filed May 17, 1944.

I claim:
1. The process of preparing vanillic acid which comprises subjecting a lignin substance at a temperature of at least about 50° C. to the oxidizing action of silver oxide in the presence of an aqueous solution of sodium hydroxide, acidifying the reaction mixture, extracting the acidified mixture with a water-immiscible vanillic acid solvent and recovering the vanillic acid from the extract.

2. The process of preparing vanillic acid which comprises preparing a mixture containing a lignin substance and an aqueous solution of sodium hydroxide, adding an aqueous solution of silver nitrate to the alkaline lignin substance mixture, acidifying the resulting alkaline reaction mixture, extracting the acidified mixture with a water immiscible vanillic acid solvent, and recovering the vanillic acid from the extract.

3. The process of preparing vanillic acid which comprises preparing a mixture containing a lignin substance and an aqueous solution of sodium hydroxide, adding an aqueous solution of silver nitrate to the alkaline lignin substance mixture, partially acidifying the alkaline reaction mixture with sulfur dioxide, extracting the acidified reaction mixture with a water immiscible vanillic acid solvent, and recovering the vanillic acid from the extract.

4. The process of preparing vanillic acid which comprises subjecting a lignin substance to the oxidizing action of silver oxide in the presence of an aqueous solution of an alkali metal hydroxide, acidifying the alkaline reaction mixture, extracting the acidified reaction mixture with a water-immiscible vanillic acid solvent and recovering vanillic acid from the extract.

5. The process of claim 4 in which the lignin substance is calcium ligno-sulfonate and the alkali metal hydroxide is sodium hydroxide.

6. The process of preparing vanillic acid in high yield which comprises digesting a lignin substance at a temperature of at least about 50° C. in an aqueous alkali metal hydroxide reaction mixture containing silver oxide, acidifying the reaction mixture, extracting the acidified mixture with a water immiscible vanillic acid solvent, extracting the solvent extract with an aqueous bicarbonate solution, acidifying the aqueous bicarbonate extract, extracting the acidified aqueous bicarbonate extract with a water immiscible vanillic acid solvent, and recovering vanillic acid from the last mentioned water immiscible solvent extract.

IRWIN A. PEARL.

REFERENCES CITED

The following references are of record in the file of this patent:

UNITED STATES PATENTS

| Number | Name | Date |
|---|---|---|
| 2,104,701 | Sandborn | Jan. 4, 1938 |
| 2,405,450 | Salvesen et al. | Aug. 6, 1946 |
| 2,419,158 | Pearl | Apr. 15, 1947 |

OTHER REFERENCES

Lautsch et al., Angewandte Chemie, vol. 53, p. 451, Sept. 28, 1940.

Ser. No. 318,386, Freudenberg et al. (A. P. C.), pub. April 20, 1943.